United States Patent [19]

Takeda et al.

[11] Patent Number: 4,734,801

[45] Date of Patent: Mar. 29, 1988

[54] RETAINING DEVICE FOR AN EJECT LEVER OF A DISK RECORDING AND REPRODUCING APPARATUS

[75] Inventors: Kuninobu Takeda; Osamu Shigenai; Takashi Toyama, all of Furukawa, Japan

[73] Assignee: Alps Electric Co., Ltd., Japan

[21] Appl. No.: 737,156

[22] Filed: May 23, 1985

[30] Foreign Application Priority Data

May 23, 1984 [JP] Japan .............................. 59-74502[U]
May 25, 1984 [JP] Japan .............................. 59-75739[U]

[51] Int. Cl.⁴ ........................ G11B 17/00; G11B 17/04
[52] U.S. Cl. .......................................... 360/97; 360/99
[58] Field of Search ................... 360/97, 99, 104, 105, 360/86, 88

[56] References Cited

U.S. PATENT DOCUMENTS

| | | | |
|---|---|---|---|
| 3,899,794 | 8/1975 | Brown, Jr. .......................... | 360/97 X |
| 4,205,355 | 5/1980 | Hamanaka et al. .................... | 360/99 |
| 4,546,396 | 10/1985 | Schatteman ........................ | 360/97 X |
| 4,574,323 | 3/1986 | Momose ............................. | 360/99 |

FOREIGN PATENT DOCUMENTS

59-77666  5/1984  Japan ..................................... 360/79

*Primary Examiner*—Stuart N. Hecker
*Assistant Examiner*—Alyssa H. Bowler
*Attorney, Agent, or Firm*—Guy W. Shoup

[57] ABSTRACT

Herein disclosed is a retaining device for retaining a generally flat elongated part of a magnetic disc recording and reproducing apparatus. The lever retaining device is used to retain a disc eject lever in position on a bearing member of a disc player while preventing the same from slipping out of the position. Two guide pins are anchored upright on the bearing member of the disc player at a predetermined spacing from each other and have circumferential grooves near the heads thereof. Two slots are formed in the disc eject lever for allowing the two guide pins to extend therethrough when the eject lever is placed on the bearing member of the disc player. A generally flat elongated retainer member made of a thin elastic plate is formed at both its ends with engagement means for engagement with the circumferential grooves of the guide pins, when it is placed on the disc eject lever, to retain the disc eject lever. The engagement means of the retainer member includes a pair of keyhole-shaped holes having wider portions arranged at a greater spacing than that of the guide pins for allowing the guide pins to easily extend therethrough when the retainer member is slightly bent, and narrower portions arranged at a spacing substantially equal to that of the guide pins for snugly fitting therein the circumferential grooves of the guide pins when the retainer member is allowed to extend flatly on the disc eject lever.

3 Claims, 20 Drawing Figures

RETAINING DEVICE FOR AN EJECT LEVER OF A DISK RECORDING AND REPRODUCING APPARATUS

BACKGROUND OF THE INVENTION

1. Field of the Invention

The present invention relates to a retaining device for retaining a generally flat elongated part in a magnetic disc recording and reproducing apparatus. In particular, it relates to a device for retaining a slidable lever which mounts across two spaced apart guide pins located inside a disc drive unit.

2. Description of the Prior Art

Generally speaking, an E-shaped or C shaped washer is used for preventing a member, through which a retaining pin extends, from slipping out from the retaining pin. In this use, however, the fitting direction of the member onto the retaining pin and the mounting direction of the E-shaped washer are different so that automatic assembly of the combined mechanism is complicated. Since an E washer has to be mounted on each pin, moreover, its mounting work takes a long time and is inefficient.

SUMMARY OF THE INVENTION

It is, therefore, an object of the present invention to eliminate the above-specified drawbacks concomitant with the prior art and to provide a retaining device which can simplify the mechanism of an automatic assembling machine and improve a production efficiency.

According to a major feature of the present invention, there is provided a retaining device for retaining a generally flat elongated plate member in position while preventing the same from slipping out of the position, comprising: two support pins arranged at a predetermined spacing from each other and each having retaining means; extension allowing means formed in said elongated plate member for allowing said two support pins to extend therethrough; and a generally flat elongated retainer member having an elasticity and formed at both its ends with engagement means for engagement with the retaining means of said support pins to retain said plate member through the extension allowing means of said plate member.

According to another feature of the present invention, there is provided a lever retaining device for retaining a disc eject lever in position on a bearing member of a disc player while preventing the same from slipping out of the position, comprising:two guide pins anchored upright o the bearing member of said disc player at a predetermined spacing from each other and having circumferential grooves near the heads thereof; extension allowing means formed in said disc eject lever for allowing said two guide pins to extend therethrough when said eject lever is placed on the bearing member of said disc player; and a generally flat elongated retainer member having an elasticity and formed at both its ends with engagement means for engagement with the circumferential grooves of said guide pins, when it is placed on said disc eject lever, to retain said disc eject lever through the extension allowing means of the same.

BRIEF DESCRIPTION OF THE DRAWINGS

Other objects, features and advantages of the present invention will become apparent from the following description taken in conjunction with one embodiment thereof with reference to the accompanying drawings, in which.

DESCRIPTION OF THE PREFERRED EMBODIMENT

Figure 1:
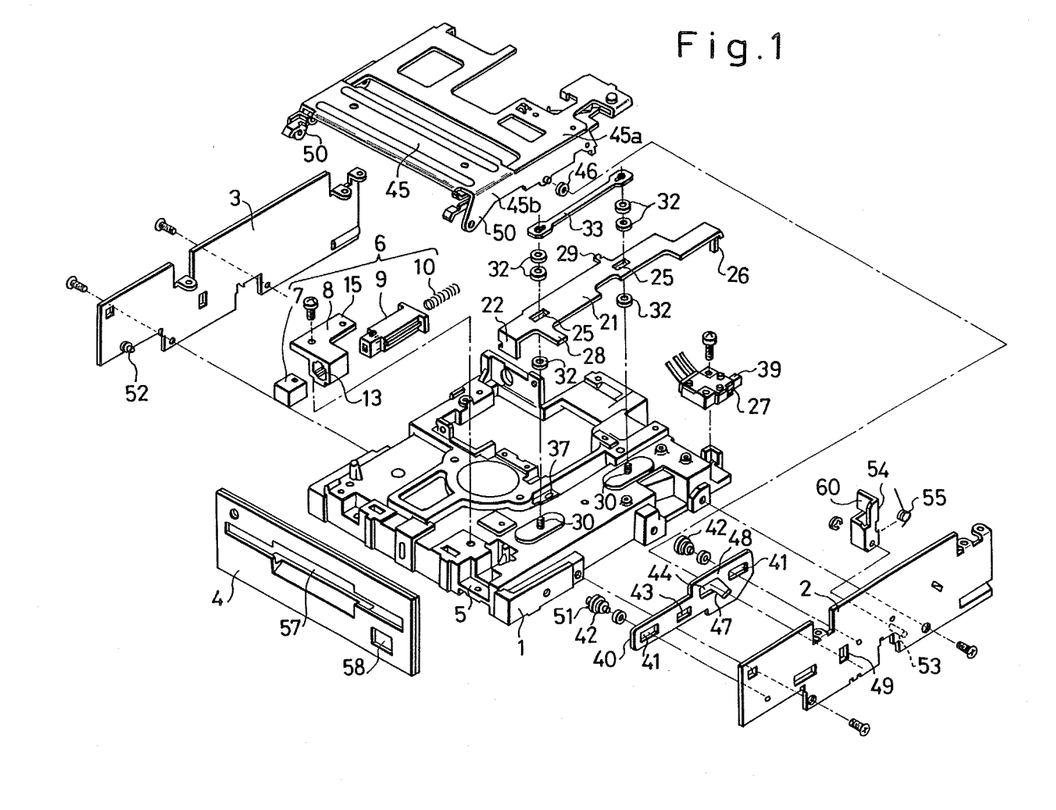
FIG. 1 is an exploded perspective view showing the essential portions of a disc recording and reproducing apparatus.

The present invention will be described in the following with reference to the accompanying drawings in case a lever retaining device of the present invention is employed in a magnetic disc recording and reproducing apparatus. FIG. 1 is an exploded perspective view showing the essential portions of the disc recording and resproducing apparatus.

A first side plate 2 and a second side plate 3 are attached to both the sides of a chassis 1 die-cast of aluminum, and a front plate 4 (or a front decorative laminated sheet) is attached to the front side of the chassis 1. Incidentally, the attachment of the front plate 4 is conducted at the final assembly of the disc recording and reproducing apparatus because the front plate 4 has different surfaces designs for the kinds of the apparatus. In an alternative, in case the disc recording and reproducing apparatus is to be assembled in the system of a computer or the like, the front decorative laminated sheet of the system commonly provides that of the disc recording and reproducing apparatus.

The chassis 1 is formed at its front portion (as is located at this side) with a mounting recess 5, in which an eject button unit 6 is mounted.

This eject button unit 6 is composed of an eject button 7, a button holder 8, a slide 9 and a button return spring 10.

Figure 2:
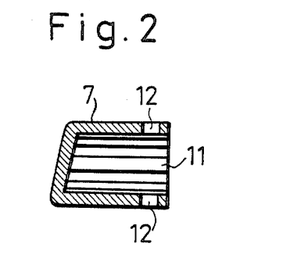
FIGS. 2 and 3 are a sectional side elevation and a back view showing an eject button, respectively.
Figure 3:
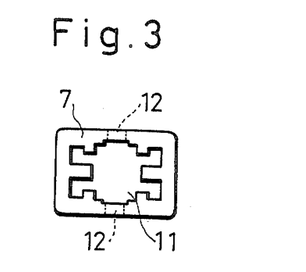

FIGS. 2 and 3 are a sectional side elevation and a back elevation showing the eject button 7, respectively. The eject button 7 is formed with a press-fitting recess 11 so that the leading end portion of the slide 9 may be press-fitted from the back thereof, and is formed in its upper and lower sides with plate stopping holes 12 communicating with the press-fitting recess 11.

Figure 4:
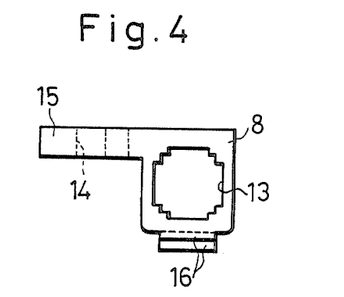
FIGS. 4, 5 and 6 are a front elevation, a top plan view and a side elevation showing a button holder, respectively.
Figure 5:
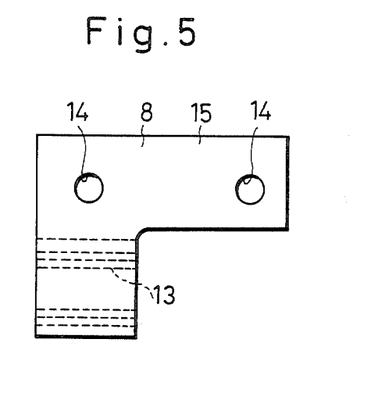
Figure 6:
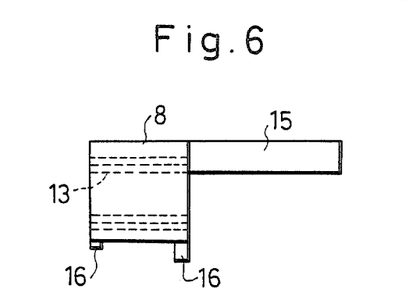

FIGS. 4, 5 and 6 are a front elevation, a top plan view and a side elevation of the button holder 8. This button holder 8 is formed guide hole 13 extending from the front to the back, at one side of its upper portion with a fixing portion 15 having mounting holes 14, and at its lower portion with stoppers 16 positioned at front and rea portions.

Figure 7:
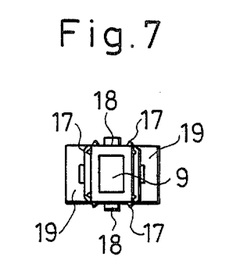
FIGS. 7, 8, 9 and 10 are a front elevation, a top plan view, a sectional top plan view and a side elevation of a slide, repectively.
Figure 8:
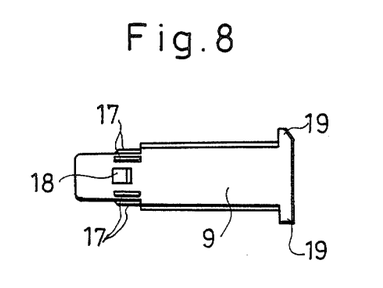
Figure 9:
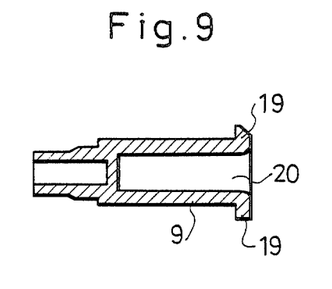
Figure 10:
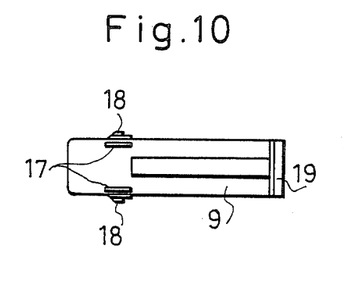

FIGS. 7, 8 and 9 are a front elevation, a top plan view and a sectional top plan view showing the slide 9. This slide 9 is formed with triangular low ridges 17 on the respective sides of its leading end portion and with retaining pawls 18 on both its upper and lower sides. The slide 9 is further formed at its rear end with a retaining flange 19 and in its side with a spring receiving hole 20 which is opened backward, as better seen from FIG. 9.

Figure 11:
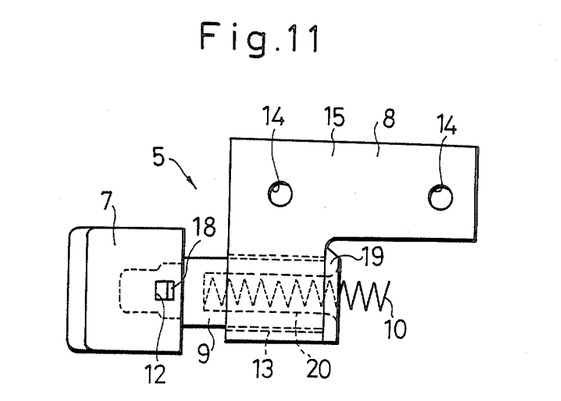
FIG. 11 is a top plan view showing an eject button unit.

Next, the assembly of the eject button unit 6 will be described in the following with reference to FIGS. 11 and 12. As shown in FIG. 11, the leading end portion of the slide 9 is first inserted into the guide hole 13 of the button holder 8 to bring the flange 19 into abutment against the end face of the button holder 8 until its leading end is protruded forward from the button holder 8. Then, the leading end portion of the slide 9 is press-fitted from the back into the recess 11 of the button 7 to insert and retain the retaining pawls 18 of the slide 9 into and in the plate stopping holes 12 of the button 7. By this press-fitting action, moreover, the ridges 17 (as better seen from FIGS. 7 and 8) of the slide 9 are brought into close contact under a locally high pressure with the inner walls of the recess 11 so that they can integrate the button 7 and the slide 9 in association with the engagement between the stopping holes 12 and the retaining pawls 18. The resultant assembly is held slidably in the button holder 8.

Figure 12:
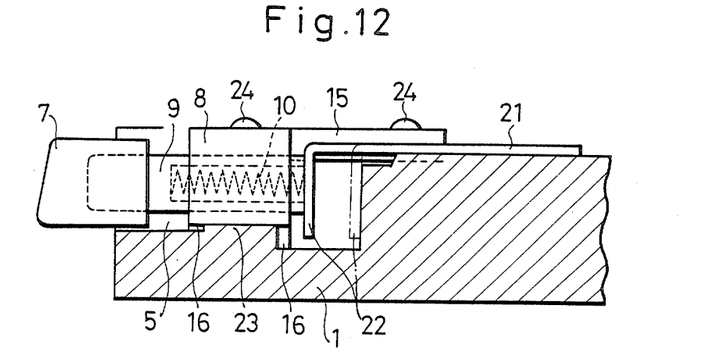
FIG. 12 is a side elevation of an essential portion showing the state in which the eject button unit is mounted.

Next, the button return spring 10 is driven and compressed into the spring receiving hole 20 so that the injection button unit 6 is mounted in the mounting recess 5 of the chassis 1, as better seen from FIG. 12. Incidentally, before the insertion of that eject button unit 6, a later-described disc eject lever 21 is attached slidably on the chassis 1 such that a spring receiving portion 22, which is formed by bending its leading end, is inserted in advance in the recess 5.

The recess 5 is formed with a positioning land 23 on its bottom so that the eject button unit 6 is fixed in position by engaging both the stoppers 16 and 16 of the button holder 8 with that land 23 and by fastening the fixing portion 15 of the button holder 8 to the chassis 1 by means of screws 24. Incidentally, the rear end of the button return spring 10 contacts elastically with the spring receiving portion 22 of the eject lever 21 so that the assembly of the eject button 7 and the slide 9 is held without play in a forwardly protruded position by the action of the spring 10.

Figure 13:
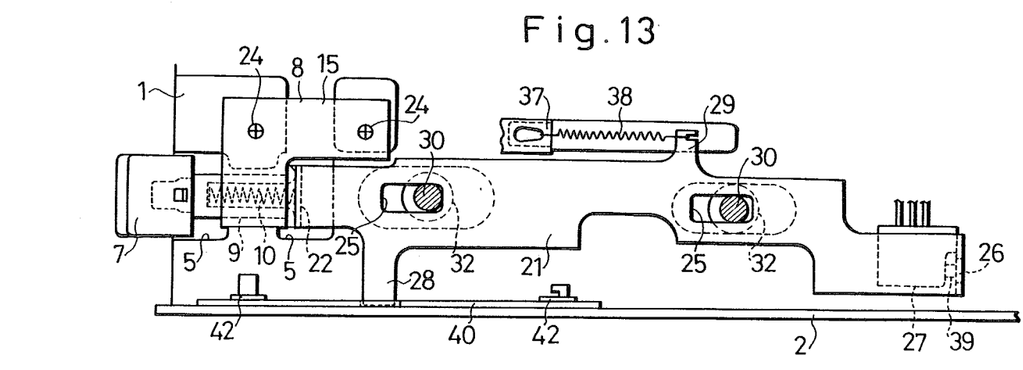
FIGS. 13 and 14 are top plan views of essential portions showing the states in which an eject lever is in its stand-by position and in its eject position, respectively.

As shown in FIG. 13, for example, the disc eject lever 21 is formed with two slots 25 and 25 at a predetermined spacing in its longitudinal (or sliding) direction and at its front and rear ends with the aforementioned spring receiving portion 22 and a switch operating end 26, both of which protrude downward. Incidentally, the switch operating end 26 is made narrower than the remaining portion, as shown in FIG. 1, so that it can be bent relatively easily, when the switching timing of the contact of a later-described micro switch 27 is to be adjusted after the assembly of the appratus, to facilitate the contacting timing with the micro switch 27, i.e., the switching timing of that contact.

The eject lever 21 is formed at one side with an engagement projection 28 extending toward the first side plate 2 and at its the other side with a spring hook 29.

Figure 15:
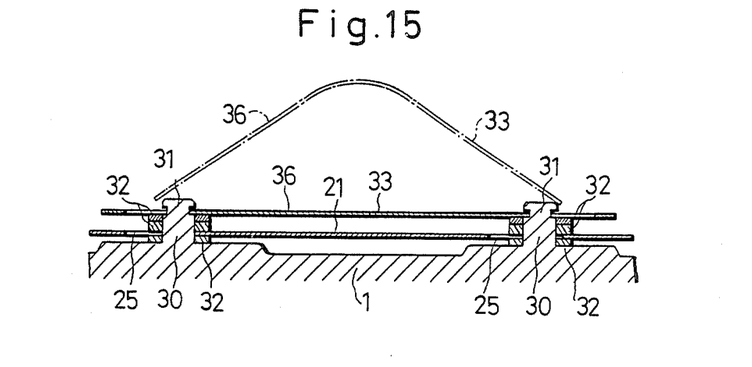
FIGS. 15 and 16 are a sectional view and a top plan view of essential portions showing the states in which an eject lever is to be retained and is retained by the retaining device of the present invention.
Figure 16:
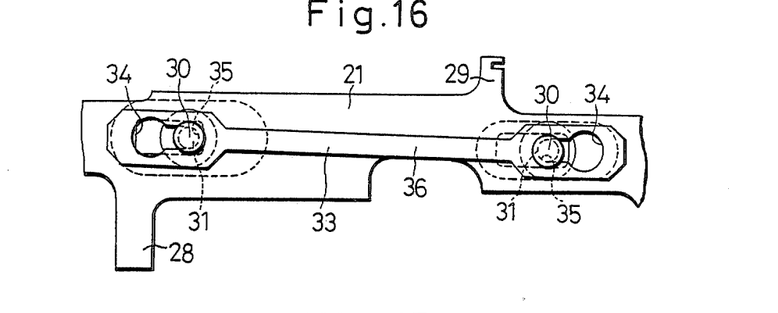

Next, the mounting operation of the eject lever 21 on the chassis 1 will be described with reference to FIGS. 15 and 16. As shown in FIG. 15, two guide pins 30 and 30 are anchored upright on the chassis 1 such that they extend through the aforementioned slots 25 and 25 of the eject lever 21. The guide pins 30 and 30 are radially reduced near their heads to form circumferential grooves 31. With reference to FIGS. 1 and 15, the eject lever 21 and a plurality of washers 32 are consecutively fitted on the guide pins 30, and a retainer member 33 is then placed across the guide pins 30 and 30. This retainer member 33 is made of a thin metal plate having an elasticity. As better seen from FIG. 17, the retainer member 33 is formed at both its ends with keyhole-shaped holes each of which has a wider portion 34 for allowing the head of the guide pin 30 to extend therethrough without any resistance and a narrower portion 35 having a width substantially equal to that of the diameter of the aforementioned circumferential groove 31 of the guide pin 30. The spacing between the narrower portions 35 at both the sides is made substantially equal or slightly larger than that between the two guide pins 30. Incidentally, an intermediate joint portion 36 jointing the two end portions of the retainer member 33 is designed so slightly narrower to facilitate its bending.

As indicated by single-dotted lines in FIG. 15, the intermediate joint portion 36 of the retainer member 33 is bent to have the two end portions positioned below, and both the two wider portions 34 are brought to above the guide pins 30. Then, the retainer member 33 is moved down in its entirety to receive the heads of the guide pins 30 through its wider portions 34 until it is released. As a result, the retainer member 33 restores its initial generally flat shape, as indicated by solid lines in the same Figure, and both its two narrower portions 35 are fitted and retained in the respective circumferential grooves 31 of the guide pins 30 so that the eject lever 21 is retained on the guide pins 30 by the retainer member 33 while being prevented from slipping out of position.

Figure 17:
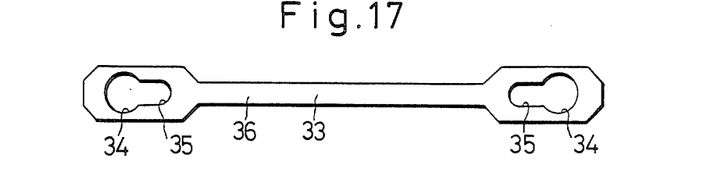
FIG. 17 is a top plan view showing a retainer member to be used in the retaining device of the present invention.
Figure 18:
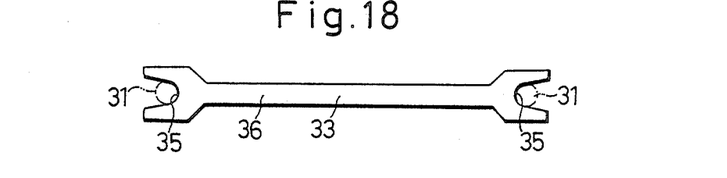
FIG. 18 is a top plan view showing a modification of the retainer member of the retaining device.

FIG. 18 is similar to FIG. 17 but shows a modification of the retainer member 33. According to this modification, the retainer member 33 is formed at both its end portions with narrower portions 35 which are made wider and opened outward. The retainer member 33 thus modified is mounted like that of FIG. 17 so that the narrower portions 35 are also fitted and retained in the circumferential grooves 31 of the guide pins 30.

Turning to FIG. 13, between the aforementioned spring hook 29 and a spring eyehook 37 disposed at the chassis 1, there is mounted under tension a tension spring 38 for elastically biasing the eject lever 21 to its eject stand-by position at all times. On the lower side of the rear portion of the eject lever 21, moreover, there is arranged the micro switch 27, the actuator 39 of which is opposed to the switch operating end 26.

The eject lever 21 is made coactive with a slide plate 40. As better seen from FIGS. 1 and 19, the slide plate 40 is formed with two slots 41 at a predetermined spacing in its longitudinal (or sliding) direction, whereas the first side plate 2 is formed in its inner side with rollers 42 which are fitted in those slots 41. The slide plate 40 is borne slidably on the first side plate 2 by the coactions between the slots 41 and the rollers 42.

Figure 19:
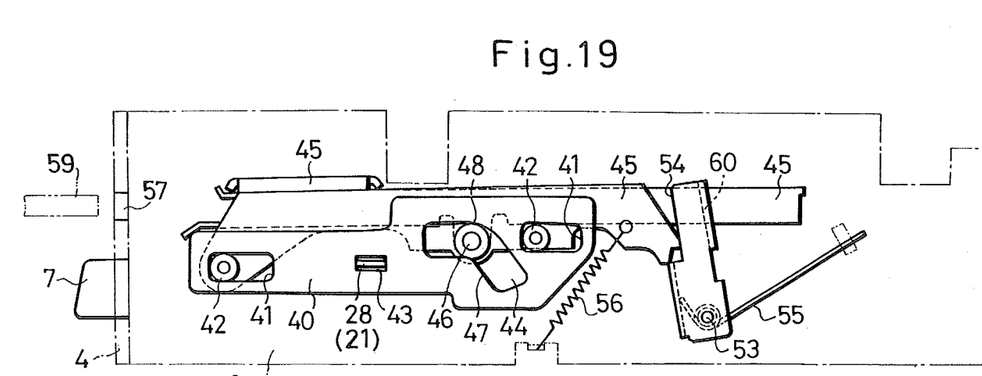
FIGS. 19 and 20 are side elevations showing essential portions for explaining the operations of a slide plate of the disc recording and reproducing apparatus.

The slide plate 40 is formed between the aforementioned slots 41 and 41 with an engagement hole 43 in which the engagement projection 28 of the aforementioned eject lever 21 is fitted to connect the eject lever 21 and the slide plate 40.

Moreover, the slide plate 40 is formed with a curved cam groove 44 which has its lower sloped portion providing a lifting cam portion 47 and its upper curved portion providing a retaining cam portion 48. As better seen from FIG. 1, the first side plate 2 is formed with a vertically extending regulating groove 49 at a position opposed to the cam groove 44. At an intermediate position of the outer side of a disc holder 45, there is rotatably borne a rising roller 46 which has its inner half fitted in the aforementioned cam groove 44 and its outer half fitted in the regulating groove 49. One of the base end portions 50 of the disc holder 45 at this side is borne rotatably on the pivot pin 51 of the aforementioned roller 42, whereas the other is borne rotatably on a pivot pin 52 which is formed to project from the inner side of the second side plate 3. Incidentally, the disc holder 45 is composed of a rocking holder 45a and a load lever 45b.

At the back of the inner side of the first side plate 2, there is rotatably borne on a pivot pin 53 a rock lever 54 which is rotationally biased forward (i.e., in the counter-clockwise direction, as seen in FIG. 19) by the action of a helcial spring 55.

Figure 20:
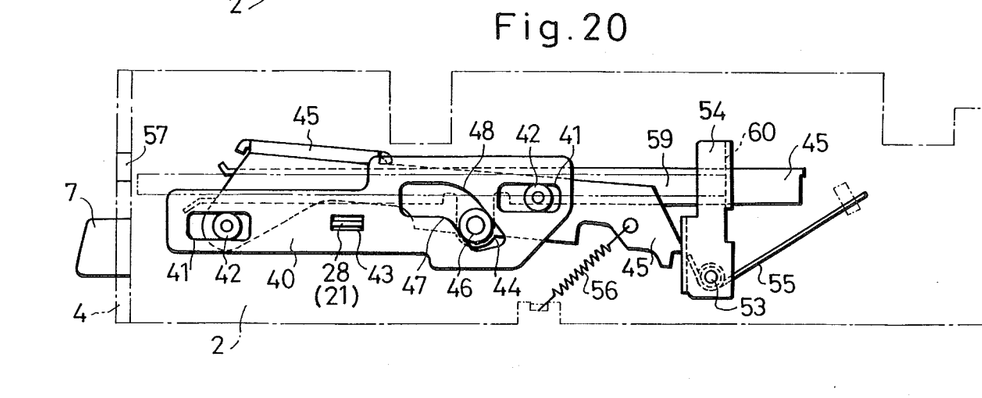

Incidentally, indicated at numeral 56 in FIGS. 19 and 20 is a tension spring which is mounted under tension between the first side plate 2 and the disc holder 45 to bias the disc holder 45 toward the load position.

In addition, the chassis is equipped with a disc drive mechanism, a drive mechanism for driving a carriage carrying a magnetic head, and a circuit base, all of which are not shown, and the front plate 4 (as shown in FIG. 1) is attached to the front side of the chassis 1 at the final assembling step. That front plate 4 is formed with a disc slot 57 and a button hole 58. When the front plate 4 is attached to the chassis 1, the center of the eject button, which is retained in advance in the chassis 1 while being prevented from coming out, and the center of the button hole 58 of the front plate 4 are so accurately aligned that the eject button 7 can protrude through the center of the button hole 58 without any misalignment.

Figure 14:
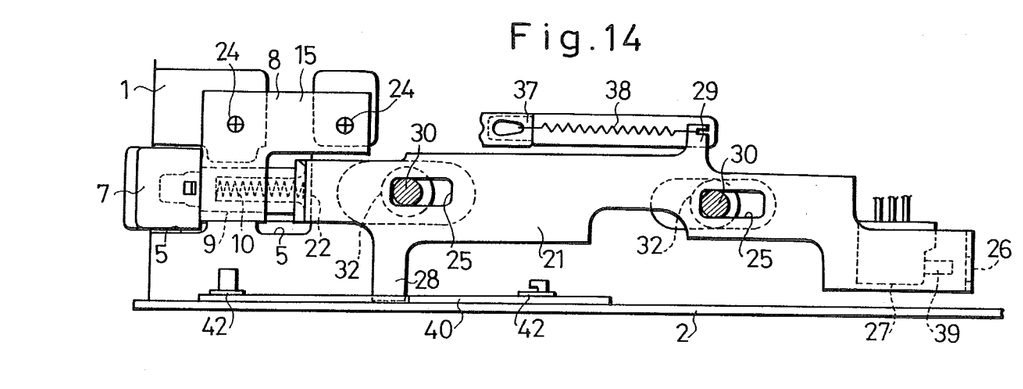

Next, the operations for loading a magnetic disc cartridge 59 in a load position will be described in the following. FIG. 19 shows the state before the magnetic disc cartridge 59 is loaded. At this time, the disc holder 45 is in an unload (or upper) position to face the disc slot 57 of the front plate 4, and the disc holder 45 has its rear end portion engaging with the rock lever 54 so that it is held on the same. On the other hand, the slide plate 40 is pushed to the rearmost eject position together with the eject lever 21 against the elasticity of the tension spring 38 (as shown in FIG. 14) so that the rising roller 46 is positioned between the upper end of the lifting cam portion 47 and the retaining cam portion 48. As a result that the rising roller 46 is at that position, i.e., by the engagement between the rising roller 46 and the retaining cam portion 48, the slide plate 40 and the eject lever 21 are retained in the eject position without being returned to the eject stand-by position.

As a result that the eject lever 21 is held in the eject position, moreover, its switch operating end 26 is apart from the actuator 39 of the micro switch 27, like FIG. 14, so that the micro switch 27 is in its OFF state. Incidentally, the eject lever 21 is at the rear eject position, but the eject button 7 is caused to protrude to the front of the front plate 4 by the elasticity of the button return spring 10.

In this state, the magnetic disc cartridge 59 is inserted from the disc slot 57 into the disc holder 45 so that its leading end portion comes into abutment against with an abutment side 60 (as shown in FIG. 1) of the rock lever 54. By inserting the magnetic disc cartridge 59, moreover, the rock lever 54 is turned clockwise against the elasticity of the helical spring 55 so that the disc holder 45 and the rock lever 54 are released from their engagement immediately after the end of insertion of the magnetic disc cartridge 59.

As a result of this release of engagement, the disc holder 45 loses its support so that it is pulled down by the action of the tension spring 56, as shown in FIG. 20. In accordance with the movement of that disc holder 45, the rising roller 46 moves down, while being guided by the regulating groove 49 (as shown in FIG. 1) of the first side plate 2, to leave the retaining cam portion 48. As a result, the slide plate 40 comes a state having lost its support so that it is pulled back to the eject stand-by (i.e., front) position together with the eject lever 21 by the action of the tension spring 38 (as shown in FIG. 13). During the return of the eject lever 21, as shown in FIG. 13, the switch operating end 26 comes into abutment with the actuator 39 to bring it so that the micro switch 27 has its contacts closed to output a set signal informing that the magnetic disc cartridge 59 is in the load position, as shown in FIG. 20. This operation is followed by the disc writing or reading operation.

Next, the ejecting operation of the magnetic disc cartridge 59 will be described in the following.

If the eject button 7 is depressed in the state of FIG. 13, the eject lever 21 is moved back (i.e., to the right, as viewed in FIG. 14) through the slide 9 to have its switch operating end 26 brought apart from the actuator 39 so that the micro switch 27 is turned off to interrupt the output of the signal. FIG. 14 shows the state in which the eject lever 21 is pushed to come to the eject position.

In accordance with the movement of that eject lever 21, moreover, the slide plate 40 is moved together to the back so that the rising roller 46 is lifted by the sloped portion of the lifting cam portion 47 and by the guide of the regulating groove 49 of the first side plate 2. By this lifting operation, the disc holder 45 holding the magnetic disc cartridge 59 is lifted from the load position to the unload position against the elasticity of the tension spring 56. At the instant when the disc holder 45 just comes into engagement with the rock lever 54, as shown in FIG. 19, the rising roller 46 reaches the upper end of the lifting cam portion 47 to engage with the retaining cam portion 48 so that the disc holder 45 is held in the unload position whereas the eject lever 21 and the slide plate 40 are held in the eject positions. Then, the magnetic disc cartridge 59 is discharged to the front through the disc slot 57 by the action of a known discharge mechanism.

As has been described hereinbefore, according to the present invention, the retainer member made of an elastic thin plate can be fitted in the same direction as that of the eject lever so that the automatic assemblying machine can have its mechanism simplified. Since only one retainer member can retain the eject lever on the two guide(or support) pins while preventing the same from slipping out of the position, moreover, the time period required for the mounting operation can be shortened to improve the productivity and to drop the production cost.

What is claimed is:

1. A retaining device for retaining a disc eject lever in position on a bearing member of a disc player while preventing the same from slipping out of position, comprising:

a pair of guide pins anchored upright on said bearing member of said disc player at a predetermined spacing from each other and each having a circumferential groove near an end thereof;

said eject lever having extension allowing means for allowing said ends of said guide pins to extend therethrough when said eject lever is mounted thereon against said bearing member; and a generally flat linear retainer member which has a certain flexibility and is formed at both its ends with engagement means arranged at said predetermined spacing for engagement with said circumferential grooves of said guide pins with said retainer member lying flat against said eject lever and extending linearly between said guide pins to hold said eject lever thereon, said retainer member being conveniently installed on said guide pins by its flexibility allowing it to be slightly bent so that said engagement means at both ends can be fitted in said circumferential grooves of said guide pins, and said retainer member thereafter snugly fitting and extending linearly between said pins and lying flat against said eject lever, wherein said extension allowing means includes a pair of slots sized and positioned to ensure allowance of the extensions of said guide pins therethrough.

2. A lever retaining device according to claim 1, wherein the engagement means of said retainer member includes a pair of keyhole-shaped holes having wider portions arranged at a greater spacing than that of said guide pins for allowing said guide pins to easily extend therethrough when said retainer member is slightly bent, and narrower portions arranged at a spacing substantially equal to that of said guide pins for snugly fitting therein the circumferential grooves of said guide pins when said retainer member is allowed to extend flatly on said disc eject lever.

3. A lever retaining device according to claim 1, wherein the engagement means of said retainer member includes a pair of generally U-shaped notches sized and spaced to have their inner edges engaging with the inner circumferential portions of said guide pins when said retainer member is allowed to extend flatly on said disc eject lever.

* * * * *